United States Patent
Rao Kodukula et al.

(10) Patent No.: US 6,215,402 B1
(45) Date of Patent: Apr. 10, 2001

(54) RADIO FREQUENCY IDENTIFICATION TRANSPONDER EMPLOYING PATCH ANTENNA

(75) Inventors: Venkata S. Rao Kodukula, Peekskill; Dah-Weih Duan, Yorktown Heights; Michael John Brady, Brewster; Christopher Adam Feild; Paul Andrew Moskowitz, both of Yorktown Heights, all of NY (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/191,642

(22) Filed: Nov. 13, 1998

Related U.S. Application Data

(60) Provisional application No. 60/077,879, filed on Mar. 13, 1998.

(51) Int. Cl.$^7$ .................................................. G08B 13/14
(52) U.S. Cl. ................................. 340/572.8; 340/572.7; 340/825.54; 343/700 MS; 343/873
(58) Field of Search .................. 340/572.7, 572.8, 340/825.54, 572.1, 551, 571, 568.1; 343/873, 895, 742, 872, 728, 700 MS

(56) References Cited

U.S. PATENT DOCUMENTS

| | | | |
|---|---|---|---|
| 4,857,893 | * 8/1989 | Carroll | 340/572.7 |
| 5,414,427 | * 5/1995 | Gunnarsson | 342/51 |
| 5,430,441 | * 7/1995 | Bickley et al. | 340/825.54 |
| 5,574,470 | * 11/1996 | De Vall | 343/895 |
| 5,654,493 | * 8/1997 | Cocita | 340/572 |
| 5,682,143 | * 10/1997 | Brady et al. | 340/572.7 |
| 5,686,928 | * 11/1997 | Pritchett et al. | 343/711 |
| 5,777,553 | * 7/1998 | Perreau et al. | 340/551 |
| 5,786,626 | * 7/1998 | Brady et al. | 257/673 |
| 5,859,587 | * 1/1999 | Alicot et al. | 340/572 |
| 5,914,862 | * 6/1999 | Ferguson et al. | 361/737 |
| 5,939,984 | * 8/1999 | Brady et al. | 340/572.1 |
| 5,945,938 | * 8/1999 | Chia et al. | 342/42 |
| 6,028,564 | * 2/2000 | Duan et al. | 343/818 |

* cited by examiner

*Primary Examiner*—Daniel J. Wu
*Assistant Examiner*—Toan Pham
(74) *Attorney, Agent, or Firm*—O'Melveny & Myers LLP

(57) ABSTRACT

A radio-frequency identification (RFID) transponder (tag) in accordance with the principles of the invention includes a patch antenna. The patch antenna may be co-located with RFID circuitry and an impedance matching circuit on one side of a substrate. A ground plane may be formed on the opposite side of the substrate. A quarter wave transformer may provide an "RF short" to ground to connect the RFID circuitry on one side of the substrate with a ground plane located on the opposite side of the substrate.

11 Claims, 2 Drawing Sheets

FIG. 1
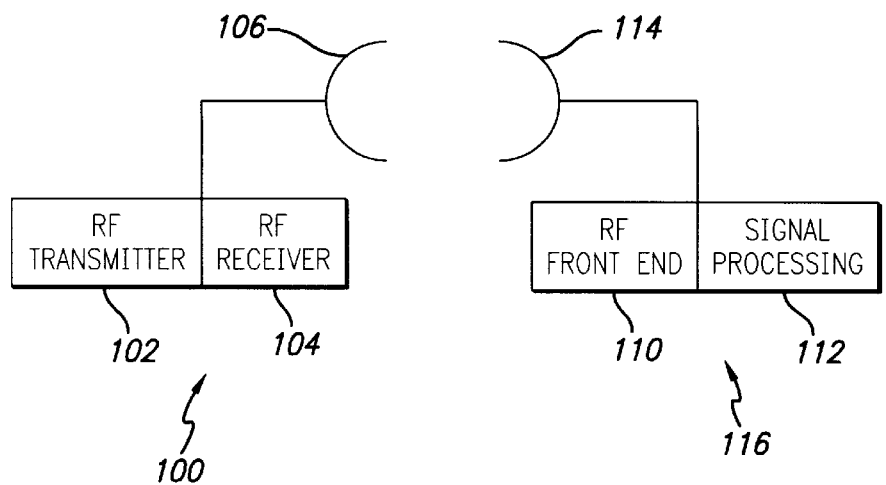
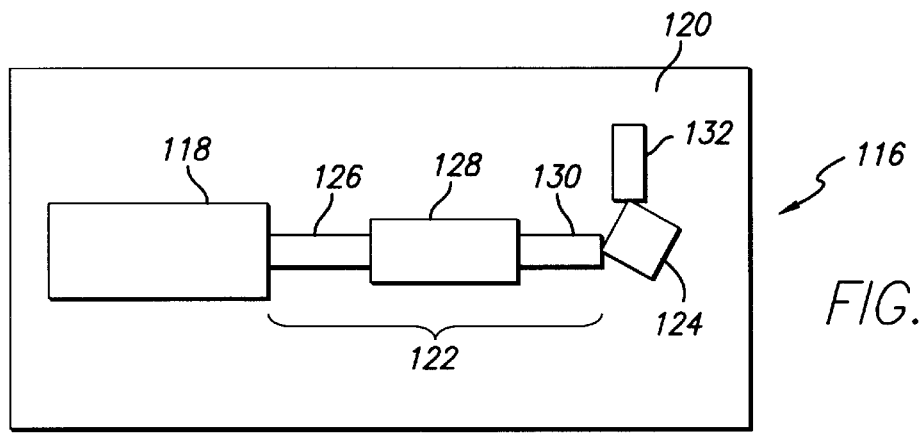
FIG. 2A
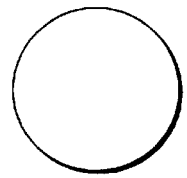
FIG. 2B
FIG. 2E
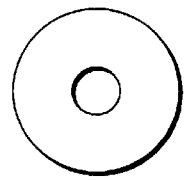
FIG. 2C
FIG. 2F
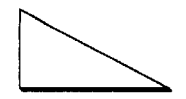
FIG. 2D

RADIO FREQUENCY IDENTIFICATION TRANSPONDER EMPLOYING PATCH ANTENNA This application claims benefits of provisional application 60/077,879 filed Mar. 13, 1998.

FIELD OF THE INVENTION

The invention relates to radio frequency identification (RFID) tags, and more particularly, to RFID tags that employ patch antennas.

BACKGROUND OF THE INVENTION

Radio Frequency Identification (RFID) transponders (tags) are operated in conjunction with RFID base stations for a variety of inventory-control, security and other purposes. Typically an item having a tag associated with it, for example, a container with a tag placed inside it, is brought into a "read zone" established by the base station. The RFID base station generates a continuous wave electromagnetic disturbance at a carrier frequency. This disturbance is modulated to correspond to data that is to be communicated via the disturbance. The modulated disturbance, which carries information and may be sometimes referred to as a signal, communicates this information at a rate, referred to as the data rate, which is lower than the carrier frequency. The transmitted disturbance will be referred to hereinafter as a signal or field. The RFID base station transmits an interrogating RF signal which is modulated by a receiving tag. The tag modulates the RF signal in order to impart to the signal information stored within the tag. The receiving tag then transmits the modulated, answering, RF signal to the base station.

RFID tags may be active, containing their own RF transmitter, or passive, having no transmitter. Passive tags, i.e., tags that rely upon modulated back-scattering to provide a return link to an interrogating base station, may include their own power sources, such as a batteries, or they may be "field-powered", whereby they obtain their operating power by rectifying an interrogating RF signal that is transmitted by a base station. Although both battery-powered and field powered tags have minimum RF field strength read requirements, or read thresholds, in general, a field-powered passive system requires at least an order of magnitude more power in the interrogating signal than a system that employs tags having their own power sources. Because the interrogating signal must provide power to a field-powered passive tag, the read threshold for a field-powered passive tag is typically substantially higher than for an active tag. However, because field-powered passive tags do not include their own power source, they may be substantially less expensive than active tags and because they have no battery to "run down", field-powered passive tags may be more reliable in the long term than active tags. And, finally, because they do not include a battery, field-powered passive tags are typically much more "environmentally-friendly".

Although field-powered passive tag RFID systems provide cost, reliability, and environmental benefits, there are obstacles to the efficient operation of field-powered passive tag RFID systems. In particular, it is often difficult to deliver sufficient power from a base station to a field-powered passive tag via an interrogating signal. The amount of power a base station may impart to a signal is limited by a number of factors, not the least of which is regulation by the Federal Communication Commission (FCC). Consequently, an RFID tag that is compact, light weight, low cost and that efficiently employs a substantial portion of the signal energy which it receives from an interrogating base station would be highly advantageous.

Related applications and issued patents

Related U.S. Patents assigned to the assignee of the present invention include: U.S. Pat. Nos. 5,528,222; 5,550, 547; 5,552,778; 5,554,974; 5,538,803; 5,563,583; 5,565, 847; 5,606,323; 5,521,601; 5,635,693; 5,673,037; 5,682, 143; 5,680,106; 5,729,201; 5,729,697; 5,736,929; 5,739, 754; and 5,767,789. Patent applications assigned to the assignee of the present invention include: application U.S. Pat. No. 5,673,037; No. 08/621,784, filed on Mar. 25, 1996 entitled, "Thin Radio Frequency Transponder with Leadframe Antenna Structure" by Brady et al. (pending); application No. 08/626,820, Filed: Apr. 3, 1996, entitled, "Method of Transporting RF Power to Energize Radio Frequency Transponders", by Heinrich et al.; application No. 08/694,606 filed Aug. 9, 1996 entitled, "RFID System with Write Broadcast Capability" by Heinrich et al.; application No. 08/681,741, filed Jul. 29, 1996 entitled, "RFID Transponder with Electronic Circuit Enabling and Disabling Capability", by Heinrich et al.; application No. 08/592,250 (See also PCT International Application No. PCT/EP95/ 03903 filed Sep. 20, 1995, and U.S. application No. 08/330, 288 filed Oct. 27, 1994, now abandoned, on which the PCT application is based); U.S. Pat. No. 5,729,201; application No. 08/909,719; application No. 08/621,784; application No. 08/660,249; application No. 08/660,261; application No. 08/790,640; application No. 08/790,639; and application No. 08/681,742. The above identified U.S. Patents and U.S. Patent applications are hereby incorporated by reference. Additionally, Patent Applications entitled, "Radio Frequency Identification Transponder Having a Spiral Antenna", "Radio Frequency Identification Transponder Having a Helical Antenna", "RFID Transponder Having Improved RF Characteristics",and "Distributed Impedance Matching Circuit For High Reflection Coefficient Load", filed on the same day as this application and assigned to the same assignees as this application is assigned are also incorporated by reference.

The applicants claim priority under 35 U.S.C. 119 (e) for provisional applications having attorney docket numbers YO897 660P1, YO897-661P1, and YO997-038P1, respectively filed on March 16, 17, and 13.

SUMMARY

A radio-frequency identification (RFID) transponder (tag) in accordance with the principles of the invention includes a patch antenna comprising a conductive patch (as opposed to a wired) located "over" a ground plane. The patch antenna may be manufactured, along with RFID circuitry and an impedance matching circuit on one side of a substrate, with a ground plane formed on the other side of the substrate. In an illustrative embodiment, the entire RFID tag is completely via-free and, consequently, extremely easy and inexpensive to manufacture. The via-free embodiment is achieved through the use of a quarter wave transformer connected to provide an "RF short" to the reference, or ground, plane on the opposite side of the board from the side to which the patch antenna, matching circuit, and RFID circuitry are affixed.

The impedance matching circuit is connected between the patch antenna and the RFID circuitry and operates to eliminate or substantially reduce reflections between the antenna and RFID circuitry. In this manner, the matching circuit insures that a substantial portion of the signal energy received from a base station is employed in responding to the base station's inquiry, rather than being dissipated through reflections and absorption.

In an illustrative embodiment the new RFID tag includes a patch antenna connected through a three-section impedance matching circuit to an input of an RFID tag integrated circuit (IC). The patch antenna, matching circuit, and RFID tag IC are all affixed to one side of a substrate and a ground plane is affixed to the opposite side of the substrate. The RFID tag integrated circuit is connected to the ground plane, not through a via, but through a quarter wave transformer which operates as an RF short to the ground plane.

BRIEF DESCRIPTION OF THE DRAWINGS

The above and further features, aspects, and advantages of the invention will be apparent to those skilled in the art from the following detailed description, taken together with the accompanying drawings in which:

FIG. 1 is a conceptual block diagram of a RFID system which includes a base station and RFID tag containing a patch antenna with impedance matching circuit in accordance with the principles of the invention;

FIGS. 2A through 2F are top plan views of an RFID tag that includes a patch antenna, and various types of patch antennas;

DETAILED DESCRIPTION

Figure 3:
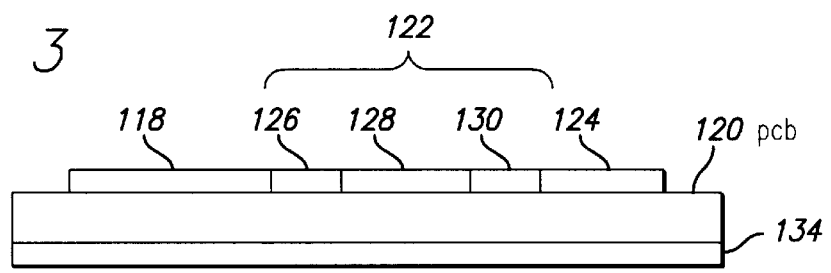
FIG. 3 is an elevation view of the RFID tag illustrated in the top plan view of FIG. 2A.

A radio-frequency identification (RFID) transponder (tag) in accordance with the principles of the invention includes a patch antenna. In an illustrative embodiment, a patch antenna, an impedance matching circuit, and RFID circuitry are formed on one surface of a substrate, with a ground plane on the other side. In an illustrative embodiment, the new RFID tag includes a printed circuit board having an integrated circuit (tag IC) mounted on one surface of the circuit board. The tag IC includes RFID tag electronics and is electrically connected to an impedance matching circuit printed on the same side of printed circuit board. The matching circuit is electrically connected to a patch antenna that is printed on same side of the printed circuit board as the tag IC and matching circuit. A ground plane is printed on the opposite side of the printed circuit board. The matching circuit is typically made of microstrip line sections connected in series and/or in parallel, and the ground plane on the opposite side of the printed circuit board is part of the microstrip line structure. Since, in the illustrative embodiment, the antenna, the impedance matching circuit and tag IC are all located on the same side of the printed circuit board, the expense and inconvenience of using a "via" to feed the antenna conductor from one side of the printed circuit board to the other is avoided. Additionally, a quarter wave transformer is connected to provide an "RF short" to the reference, or ground, plane on the opposite side of the board from the side to which the patch antenna, matching circuit, and RFID circuitry are affixed. In this manner, a completely via-free RFID tag, with the attendant benefits of low manufacturing costs and high mechanical reliability, may be produced.

An RFID system in accordance with the principles of the present invention is illustrated in the conceptual block diagram of FIG. 1. An RF base station 100 includes an RF transmitter 102, an RF receiver 104, and an antenna 106 connected to the transmitter 102 and receiver 104. An RF tag 116 such as may be used in conjunction with the base station 100 includes an RF front end 110, a signal processing section 112, and a patch antenna 114. The patch antenna 114 permits the RF tag to be both compact and inexpensive.

In operation, the base station 100 interrogates the tag 116 by generating an RF signal having a carrier frequency $F_c$. The carrier frequency $F_c$ is chosen based on a number of factors known in the art, including the amount of power permitted at that frequency by FCC regulations. The RF signal is coupled to the antenna 106 and transmitted to the tag 116. The RF signal emitted by the antenna 106 will, ostensibly, be received by the tag antenna 114. If the RF signal's field strength meets a read threshold requirement, the RF tag will respond to the reception of the signal by modulating the RF carrier to impart information related to the tag contents onto the back-scattered RF field, which propagates to the base station 100. The RF signal transmitted by the base station 100 must have sufficient field strength, taking into account the polarization of the signal and of the tag's antenna, at the location of the tag 116 for the tag to detect the RF signal. In the case of a field-powered passive tag, the interrogating signal's field strength generally must be great enough for the tag 116 to rectify the signal and to use the signal's energy for the tag's power source.

Turning now to FIG. 2A, an illustrative embodiment of an RF tag in accordance with the principles of the present invention is shown in a top plan view. The RF ID tag 116 includes a patch antenna 118 which may be formed of a layer of conductive material, such as copper, deposited in any of a variety of patterns on a substrate 120, such as a printed circuit board, using conventional printed circuit techniques. Although a rectangular patch antenna is illustrated in FIG. 2A, many shapes, including the circular patch antenna of FIG. 2B, the annular patch antenna of FIG. 2C, the triangular patch antenna of FIG. 2D, the partial circular patch antenna of FIG. 2E, and the partial annular patch antenna of FIG. 2F, are known. Patch antennas are discussed, for example, in U.S. Pat. No. 5,006,859 issued to Wong, et al, and U.S. Pat. No. 5,245,745 issued to Jensen et al, and in Y. T. Lo, S. W. Lee, "Antenna Handbook", Vol.2, chp.10, 1993 Van Nostrand Reinhold, which are hereby incorporated by reference. As is known in the art, the substrate 120 may be composed of an epoxy resin, epoxy glass, or other material that may be rigid or flexible. These materials may be of a variety of thicknesses and may exhibit any of a variety of relative permittivities. The illustrative embodiment employs a 30 mil thick sheet of material known as "fire resistant four" or FR-4, which has a relative permittivity of approximately 4.5, as the board material.

Returning to FIG. 2A, an impedance matching circuit 122 connects the antenna 118 to RFID circuitry 124. In this illustrative embodiment, the impedance matching circuit 122 includes three microstrip sections 126, 128, and 130 connected in series. Other impedance matching circuits, including those that employ lumped elements, such as inductors and capacitors, could be employed to match the impedance of the antenna 118 to that of the RFID circuitry 124. Additionally, although, in this illustrative embodiment, the RFID circuitry is incorporated in a single integrated circuit (tag IC), the RFID circuitry could comprise interconnected discrete electronic components. The antenna 118, impedance matching circuit 122 and tag IC 124 are printed and mounted on the first side of a printed circuit board 120 which may also be composed of a material such as FR-4. A ground plane is formed on the other side of the printed circuit board. The tag IC incorporates the RF front end 110 and signal processing 112 functions discussed in relation to FIG. 1. The tag IC 124 may be implemented with any of a variety of package styles but is, in the illustrative embodiment, packaged in a mini small outline package (MSOP) and is mounted directly to the circuit board 120 and connected to the impedance matching circuit 122. Such "surface mounting" of IC packages is known, and is discussed, for example in U.S. Pat. No. 5,528,222 entitled "Radio Frequency Circuit and Memory in Thin Flexible Package", issued Jun. 18, 1996 to Moskowitz et al, which is hereby incorporated by reference. Additional packaging techniques that may be employed are discussed in a copending patent application assigned to the same assignees as the assignees of this application, entitled, "Radio Frequency Identification System", having inventors Michael J. Brady, Dah-Weih Duan, and Venkata S. R. Kodukula, and filed on Oct. 29, 1998 which is also hereby incorporated by reference. Impedance matching circuits are known and described, for example, in "The Art Of Electronics", Second Edition, Paul Horowitz and Winfield Hill, Cambridge University Press, 1989, pp. 879–883, which is hereby incorporated by reference. Impedance matching circuits are also discussed in a copending patent application assigned to the same assignee as the assignee of the present invention, entitled, "Distributed Impedance Matching Circuit For High Reflection Coefficient Load", having inventors Michael J. Brady, Dah-Weih Duan, and Venkata S. R. Kodukula, which is being filed on the same date as this application and which is hereby incorporated by reference in its entirety.

In an illustrative embodiment, the matching circuit includes a 50 ohm microstrip line 126 which broadens into a 5 ohm line 128, then returns to a 50 ohm line 130. A more detailed description of the matching circuit is set forth in a copending application assigned to the same assignee as this application, filed on the same day as this application by the same inventors, entitled, "Distributed Impedance Matching For High Reflection Coefficient Load", Ser. No. 09/192,052, filed Nov. 13, 1998, which is hereby incorporated by reference. In the illustrative embodiment of FIG. 2A, the microstrip lines are printed copper with a "ground plane" deposited on the opposite side of the board. The tag IC 124 is soldered at one antenna input to the 50 ohm line 130. The other antenna input of the tag IC is soldered to a 50 ohm microstrip line quarter wave transformer 132. The length of the quarter wave transformer 132 is chosen to be one quarter the guided wavelength in the microstrip line at the base station interrogating signal's carrier frequency, which may be 915 Mhz, 2.45 GHz or another selected frequency. Quarter wave transformers are known and are discussed, for example, in a U.S. Provisional Patent Application entitled "RF TAG HAVING QUARTER WAVE TRANSFORMER", with inventors Field, Duan, Brady, Moskowitz, and Kodukala. This provisional application was filed on Mar. 13, 1998 and is hereby incorporated by reference in its entirety. As noted above, other, conventional, matching circuits, such as lumped circuits that employ elements such as inductors and capacitors, may also be used to match the impedances of the antenna 118 and RFID tag circuitry 124. Furthermore, a matching circuit may be integrated within the tag IC 124 itself. As is known in the art, a microstrip line includes three components: a conductive line on one surface of a substrate, a dielectric substrate, and a ground plane on the opposite side of the substrate. Typically, the fabrication of microstrip lines begins with a printed circuit board having copper on both surfaces. The copper on one side is then etched to pattern the line, and the copper on the "opposite" side of the board is left intact to form a ground plane.

In the illustrative embodiment of FIG. 2A, the impedance matching circuit 122 takes the form of a series-connected three section microstrip circuit. A first transmission line section 130 is connected to a RFID tag circuit in the form of a tag IC 124, which exhibits a complex impedance $Z_S$ having respectively low and high, real and imaginary parts. Source impedances having a low real part, on the order of 10 ohms, and relatively high imaginary parts, which may range up to several hundred ohms, are particularly difficult impedances to which to match a load impedance. To properly match impedances in this case, that is, to extract the maximum power from the tag IC 124, the load impedance should have an impedance that is the complex conjugate of the source impedance.

Although it is conceivable that one could use a single transmission line section to match the load impedance to the source impedance by transforming the load impedance to either a very high resistance or to a very low resistance, neither approach is particularly practical. That is, to obtain a high enough resistance for the first approach, some portion of a line in the circuit would have to be so narrow as to be impractical. For example, current printed circuit techniques limit the width of a micro strip line to no less than 4 mils. The width of the line would be impractical, not only because of the special photolithographic techniques that would be required, with their attendant costs, but slight variations in the line's width could result in significant performance variations. On the other hand, a single micro strip line wide enough to reduce the load impedance to a very low resistance would be so wide as to disturb operation of the load in some cases. For example a continuously tapered line that is very wide at a low impedance end and narrow at a high impedance end, may have to be so wide at the low impedance end as to present interference to other circuit components and it may radiate a significant amount of energy, rather than guiding the energy through the circuit as intended. Additionally, the narrow end may have to be so narrow as to preclude manufacture by conventional printed circuit board techniques, and, as noted above, any small absolute variations in the width would result in large percentage variations of the high impedance end. Consequently, the illustrative embodiment of FIG. 2A employs three transmission line sections (microstrip lines in the illustrative embodiment here) to transform the tag IC's impedance into an impedance which matches the load.

From the perspective of looking into the tag IC 124, the first section 130 transforms the low-resistance/high-reactance impedance of the source into a low valued resistance. The magnitude of the reflection coefficient of the first section/source combination is substantially equal to the magnitude of the tag IC's reflection coefficient (with respect to a conventional 50 ohm system impedance). A second section 128 transforms the impedance looking into the second section into an intermediate valued resistance. In the illustrative embodiment, the second section 128 is implemented as a quarter wave transformer to simplify the impedance matching circuit. A third section 126 transforms the intermediate valued resistance of the second section into a resistance which matches the load, that is, the antenna 118. Through use of this multi-section impedance structure, the third section 126 may be implemented with an impedance that does not require an extremely thin transmission line profile. That is, the impedance of the third section 126 need not be so high as to require special photolithographic techniques and, consequently, the cost and reliability of the matching circuit will be substantially improved when compared to a matching circuit that employs the very narrow transmission lines necessary to produce high impedances.

From the perspective of looking into the antenna 118, the third section 126 transforms the load impedance into an intermediate impedance, the second section 128 transforms this impedance into a relatively low resistance (on the order of ten ohms or less), and the first section 130 transforms the low resistance of the second section to the complex conjugate of the source impedance, presented by the tag IC 124. Nevertheless, if less than optimum performance may be tolerated in a particular application, a single 50 ohm microstrip line may be used as the impedance matching circuit 122. Although such an impedance matching circuit does not provide the performance of the multi-section impedance matching circuit of FIG. 2A, its simple geometry makes it easier to implement.

In the illustrative embodiment of FIG. 2A, the RFID circuitry is typically connected at one terminal through the impedance matching circuit 122 to an antenna. Another terminal of the RFID circuit, one which provides an electrical reference point, or "ground" is connected to a quarter wave transformer formed by an open-ended microstrip line 132. The quarter wave transformer 132 acts as an RF short to the ground plane, thus providing an electrical reference for the circuit without requiring the use of a via through the substrate material. This via-free connection to the ground plane eliminates substantial manufacturing costs and improves the reliability of the RFID tag circuitry.

The elevation view of FIG. 3 is of an illustrative embodiment of the patch antenna RFID tag in which the patch antenna 118, the impedance matching circuit 122, the tag IC 124, and quarter wave transformer 132 (not shown) are mounted on one surface of the printed circuit board 120. This surface may be referred to herein as the "top" surface, for the ease and clarity of description. Although the tag IC 124 would generally protrude from the top surface of the printed circuit board 120 farther than the antenna 118 or matching circuit 122, this is not illustrated in FIG. 3.

Figure 4A:
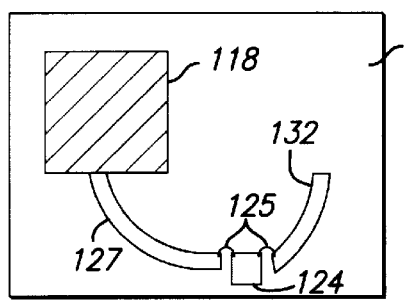
FIGS 4A through 4B are top plan views of alternative embodiments of an RFID tag having curved impedance matching circuits.
Figure 4B:
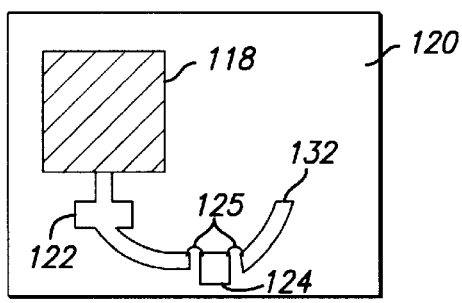

As illustrated in the top plan view of FIG. 4A, an RFID tag in accordance with the principles of the present invention may include curved elements in order to permit all the RFID tag elements to fit within the relatively limited space of a compact RFID tag. For example, the patch antenna 118 is mounted on a substrate as previously described and connected by a curved antenna feed element 127 to the RFID circuit 124. The RFID circuit is connected to the previously described quarter wave transformer 132 which, in this embodiment, is curved to fit within the limited surface area of the tag 116. Although the illustrated connections 125 between the RFID circuitry 124 and antenna feed 127 and quarter wave transformer 132 employ wire bonding techniques, as previously discussed, any of a variety of interconnection, packaging and mounting techniques may be employed. As illustrated in the top plan view of FIG. 4B, the impedance matching circuit 122 may also be somewhat curved in order to fit all the RFID tag elements within the confined space made available by the substrate 120. In general, since "bending" the elements may reduce their efficiency, curved elements such as the antenna feed 127, the impedance matching circuit 122, and the quarter wave transformer 132, should be no more curved than is required to fit the elements into the available space. That is, because curved elements may increase power losses through radiation or surface waves, the amount of curving employed to fit the antenna and other elements, such as the impedance matching elements and the quarter wave transformer, onto the limited space afforded by the RFID tag geometry should be kept to a minimum.

Figure 5A:
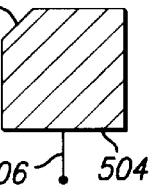
FIGS. 5A through 5E are top plan views of alternative embodiments of an RFID tag having circularly polarized patch antenna configurations.
Figure 5B:
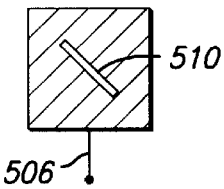
Figure 5C:
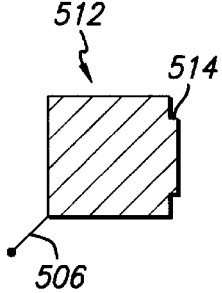
Figure 5D:
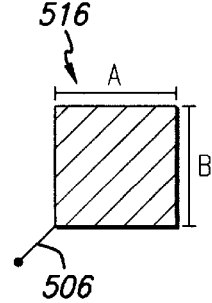
Figure 5E:
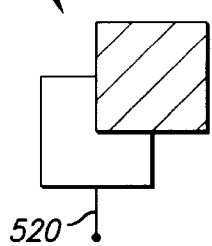

In general, the patch antenna 118 may be elliptically polarized and, in special cases of elliptical polarization, either linearly or circularly polarized. Circular polarization permits the tag to receive substantially more power from a base station than a linearly polarized antenna would. Consequently, a circularly polarized antenna generally provides a greater read distance. However, a linearly polarized antenna is more "forgiving", in that it is simpler to design and implement, tolerates more manufacturing errors, and provides a wider frequency bandwidth. FIGS. 5A through 5E illustrate additional, circularly polarized, patch antenna configurations that may be employed in various embodiments of the present invention. FIG. 5A is a "clipped square" 500 of conductive material in which two corners 502 and 504 have been cut to provide circular polarization. An antenna feed 506 provided electrical connection to the antenna. The antenna embodiment 512 of FIG. 5B includes a center slit 510 which yields a circularly polarized antenna and the antenna embodiment of FIG. 5C includes a trim tab 514 which permits the trimming of the antenna to yield circular polarization. The rectangular patch 516 of FIG. 5D features sides having linear dimensions A and B that are respectively $\lambda/2+\Delta$ and $\lambda/2-\Delta$ in length, where, $\lambda$, is the RFID system's carrier frequency wavelength and, $\Delta$, is an incremental distance which yields circular polarization in the antenna 516. The patch antenna 518 of FIG. 5 E includes a dual feed connected to two sides of the patch thereby yielding a circularly polarized antenna.

Figure 6:
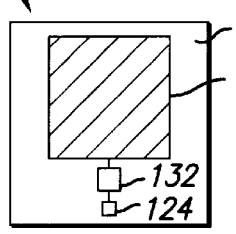
FIG. 6 is a top plan view of an alternative embodiment of an RFID tag having a lumped circuit element impedance matching circuit.
Figure 7:
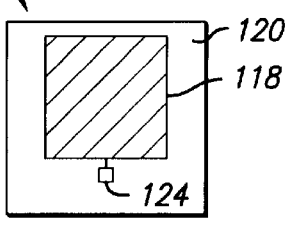
FIG. 7 is a top plan view of an alternative embodiment of an RFID tag having an impedance matching circuit embedded in the RFID IC.

In the RFID tag 116 of FIG. 6 the impedance matching circuit 132 is a lumped circuit element impedance matching circuit which may include such lumped circuit elements as capacitors or inductors. In the illustrative RFID tag embodiment 116 of FIG. 7, the RFID circuitry is incorporated within an RFID integrated circuit 124 which includes impedance matching circuitry on-chip. That is, rather than having an external impedance matching circuit, such as the distributed multi-section circuitry, or the lumped circuit element circuitry previously discussed, in this illustrative embodiment, the RFID tag incorporates circuitry within itself that permits it to operate with the patch antenna 118 in a non-reflective mode.

The substrate 120 may be made of any of a variety of materials, including printed circuit boards, flex circuits, ceramic materials, including microwave grade ceramics which feature low losses, such as those available from Rodgers Corporation, Franklin, Mass., and relatively lossy, inexpensive ceramics such as those typically employed in kitchen or bathroom tiles. The substrate could also employ various glasses, dielectric materials with high relative dielectric constants, and/or various plastic materials such as Polypropylene, Polyethylene, or Polyester. Additionally, commercial mirror materials composed of a conductive material deposited on a glass surface may be employed as an extremely low-cost substrate, with the added benefit that the conductive coating on the back of the mirror may act as a ground plane for the RFID tag.

In the illustrative embodiments, the RFID tag may be packaged, for example in a relatively low profile plastic container composed of a material such as Polypropylene, Polyethylene, Polyester, etc. The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. An RFID tag comprising:
    an RFID circuit affixed to a first side of a substrate, the RFID circuit further comprising an RFID tag IC having an antenna terminal;
    a patch antenna affixed to said first side of the substrate;
    an impedance matching circuit affixed to said first side of the substrate and connected between said RFID circuit and said Patch antenna to match the impedance of the RFID circuit to that of the antenna, wherein the impedance matching circuit further comprises a series-connected three-section microstrip circuit connected between the antenna and the antenna terminal of the RFID tag IC;
    a ground plane affixed to a second side of said substrate, opposite said RFID and impedance matching circuits; and
    a quarter wave transformer connected to a second connection of the tag IC to provide a via free connection between the tag IC and said ground plane;
    wherein the impedance matching circuit comprises:
        a first transmission line connected to the RFID tag IC, the first transmission line transforming the relatively high impedance of the RFID tag IC into an impedance that is a substantially pure resistance and that has a reflection coefficient having a magnitude that is substantially the same as the reflection coefficient of the tag IC, and one or more series-connected transmission line(s) connected to the first transmission line, said one or more series-connected transmission line(s) transforming the relatively low valued substantially pure resistivity looking into the first transmission line into an impedance that matches the impedance of the antenna.

2. The RFID tag of claim 1 wherein the transmission lines comprise conductive traces photolithographically applied to a printed circuit board.

3. The RFID tag of claim 1 further including a via-free connection between a terminal of the RFID tag IC and the ground plane on the opposite side of the substrate from the RFID tag IC, the via-free connection comprising:
    a quarter wave transformer connected to the RFID tag IC terminal on said first side of the substrate.

4. An RFID tag comprising:
    an RFID circuit affixed to a first side of a substrate, the RFID circuit further comprising an RFID tag IC having an antenna terminal;
    a patch antenna affixed to said first side of the substrate;
    an impedance matching circuit affixed to said first side of the substrate and connected between said RFID circuit and said patch antenna to match the impedance of the RFID circuit to that of the antenna, wherein the impedance matching circuit further comprises a series-connected three-section microstrip circuit connected between the antenna and the antenna terminal of the RFID tag IC;
    a ground plane affixed to a second side of said substrate, opposite said RFID and impedance matching circuits; and
    a quarter wave transformer connected to a second connection of the tag IC to provide a via free connection between the tag IC and said ground plane;
    wherein the impedance matching circuit comprises:
        a first transmission line for connection to the RFID tag IC, the line having an impedance that transforms the RFID tag IC impedance into a small-valued, substantially pure resistance,
        a second transmission line connected in series to the first transmission line, the second transmission line having an impedance that transforms the input impedance looking into the first transmission line when the first transmission line is connected to the RFID tag IC into an intermediate-valued impedance, and,
        a third transmission line that transforms the intermediate-valued impedance looking into the second transmission line into an impedance that substantially matches the impedance of the antenna.

5. The RFID tag of claim 4 wherein the second transmission line further comprises a quarter wave transformer.

6. The RFID tag of claim 4 wherein the second transmission line provides an impedance, looking into the second line when connected to the first line, that permits the third line to be produced using standard photolithographic processes to match the impedance of the antenna.

7. An RFID tag comprising:
    an RFID circuit affixed to a first side of a substrate, the RFID circuit further comprising an RFID tag IC having an antenna terminal;
    a patch antenna affixed to said first side of the substrate;
    an impedance matching circuit affixed to said first side of the substrate and connected between said RFID circuit and said patch antenna to match the impedance of the RFID circuit to that of the antenna, wherein the impedance matching circuit further comprises a series-connected three-section microstrip circuit connected between the antenna and the antenna terminal of the RFID tag IC;
    a ground plane affixed to a second side of said substrate, opposite said RFID and impedance matching circuits; and
    a quarter wave transformer connected to a second connection of the tag IC to provide a via free connection between the tag IC and said ground plane;
    wherein the impedance matching circuit comprises:
        a first transmission line for connection to the source, the line having an impedance that transforms the RFID circuit impedance into a small-valued, substantially pure resistance,
        a second transmission line connected in series to the first transmission line, the second transmission line having an impedance that transforms the input impedance looking into the first transmission line when the first transmission line is connected to the RFID circuit into an intermediate-valued impedance, and,
        a third transmission line that transforms the intermediate-valued impedance looking into the second transmission line into an impedance that substantially matches the impedance of the antenna.

8. The RFID tag of claim 7 wherein the second transmission line further comprises a quarter wave transformer.

9. The RFID tag of claim 8, wherein the ground plane on the second side of the substrate from the quarter wave transformer encompasses substantially more than a corresponding outline of the quarter wave transformer.

10. The RFID tag of claim 8 wherein the quarter wave transformer further comprises an open-ended, or non-loaded, quarter wave transformer.

11. An RFID system comprising:

an RFID base station; and an RFID tag configured to communicate with the RFID base station, the RFID tag including:

an RFID circuit affixed to a first side of a substrate, a patch antenna affixed to said first side of the substrate, an impedance matching circuit affixed to said first side of the substrate and connected between the RFID circuit and said patch antenna to match the impedance of the RFID circuit to that of the antenna, the impedance matching circuit further comprising a multi-segment transmission line; and a ground plane affixed to a second side of said substrate, opposite said RFID and impedance matching circuits, wherein the RFID circuit further comprises an RFID tag IC having an antenna terminal, and wherein the impedance matching circuit comprises:

a first transmission line connected to the RFID tag IC, the first transmission line transforming the relatively high impedance of the RFID tag IC into an impedance that is a substantially pure resistance and that has a reflection coefficient having a magnitude that is substantially the same as the reflection coefficient of the tag IC, and one or more series-connected transmission line(s) connected to the first transmission line, said one or more series-connected transmission line(s) transforming the relatively low valued substantially pure resistivity looking into the first transmission line into an impedance that matches the impedance of the antenna.

* * * * *